United States Patent
Eronen et al.

(10) Patent No.: US 10,567,902 B2
(45) Date of Patent: Feb. 18, 2020

(54) USER INTERFACE FOR USER SELECTION OF SOUND OBJECTS FOR RENDERING

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/194,683

(22) Filed: Nov. 19, 2018

(65) Prior Publication Data

US 2019/0166446 A1     May 30, 2019

(30) Foreign Application Priority Data

Nov. 27, 2017    (EP) ..................... 17203771

(51) Int. Cl.
| | |
|---|---|
| *H04S 7/00* | (2006.01) |
| *G06F 3/16* | (2006.01) |
| *G06F 3/0484* | (2013.01) |
| *H04S 3/00* | (2006.01) |

(52) U.S. Cl.
CPC .......... *H04S 7/302* (2013.01); *G06F 3/04847* (2013.01); *G06F 3/165* (2013.01); *G06F 3/167* (2013.01); *H04S 3/002* (2013.01); *H04S 3/008* (2013.01); *H04S 7/305* (2013.01); *H04S 2400/11* (2013.01)

(58) Field of Classification Search
CPC . H04S 7/30; H04S 7/302; H04S 7/303; H04S 7/305; H04S 3/002; H04S 3/008; H04S 2400/11; G06F 3/16; G06F 3/165; G06F 3/167; G06F 3/04847
See application file for complete search history.

(56) References Cited

U.S. PATENT DOCUMENTS

| | | |
|---|---|---|
| 7,563,168 B2 | 7/2009 | Jahnke |
| 2003/0018477 A1 | 1/2003 | Hinde |
| 2007/0021961 A1 | 1/2007 | Oh |
| 2011/0153044 A1 | 6/2011 | Lindahl et al. |

(Continued)

FOREIGN PATENT DOCUMENTS

EP     3236363 A1    10/2017

OTHER PUBLICATIONS

Sony's 'Joshua Bell VR Experience' on PSVR is Among the Best VR Video You'll Find on Any Headset, Road Tovr, Retrieved on Nov. 30, 2018, Webpage available at : https://www.roadtovr.com/now-psvr-sonys-joshua-bell-vr-experience-among-best-vr-video-youll-find-headset/.

(Continued)

*Primary Examiner* — Thang V Tran
(74) *Attorney, Agent, or Firm* — Harrington & Smith (57) ABSTRACT

A method comprising:
rendering a user interface for user selection of sound objects for rendering,
each sound object being associated with a location in a three-dimensional sound space,
wherein the user interface maps sound objects onto at least one shape and identifies sound objects on the shape at a collection of locations on the shape that differs from the associated locations of the identified sound objects; and
in response to a user actuation selecting a sound object,
rendering at least the selected sound object in the three-dimensional sound space at its associated location.

20 Claims, 8 Drawing Sheets

(56) References Cited

U.S. PATENT DOCUMENTS

| | | | | |
|---|---|---|---|---|
| 2012/0062700 A1* | 3/2012 | Antonellis | ............ | G10L 19/008 |
| | | | | 348/43 |
| 2012/0314875 A1* | 12/2012 | Lee | ....................... | G10L 19/008 |
| | | | | 381/22 |
| 2017/0280169 A1* | 9/2017 | Maness | ................ | H04N 21/233 |
| 2019/0124463 A1* | 4/2019 | Eronen | ................... | H04S 7/302 |
| 2019/0222798 A1* | 7/2019 | Honma | ................... | G10L 19/00 |

OTHER PUBLICATIONS

Shah et al., "Metrics for Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2, 1998, pp. 107-133.

Smith, "Towards a logic of innovation", The International Handbook on Innovation, Dec. 2003. p. 347-365.

Extended European Search Report received for corresponding European Patent Application No. 17203771.5, dated May 28, 2018, 7 pages.

\* cited by examiner

USER INTERFACE FOR USER SELECTION OF SOUND OBJECTS FOR RENDERING

TECHNOLOGICAL FIELD

Embodiments of the present invention relate to a user interface for user selection of sound objects for rendering.

BACKGROUND

Spatial (or volumetric) audio involves the rendering of different sound objects at different three-dimensional locations. Each sound object can be individually controlled. For example, its intensity may be controlled, its location or position may be controlled or other characteristics of the sound object may be individually controlled. This enables the relocation of sound sources within an sound scene that is rendered to a user. It also enables the engineering of that sound scene.

Spatial audio may, for example, be rendered to a user using multiple speakers e.g. 5.1 or 7.1 surround sound or may be rendered to a user via headphones e.g. binaural rendering.

Spatial audio may be used to render audio content to a user or may be used to render the audio part of multi-media content to a user. Where multi-media content is rendered the visual content may, for example, be rendered via mediated reality, for example virtual reality or augmented reality. It may, in some circumstances, be desirable to allow a user, who may, for example, be a content consumer or a content engineer, to comprehend the content of a sound scene without fully rendering the sound scene to that user.

BRIEF SUMMARY

According to various, but not necessarily all, embodiments of the invention there is provided a method comprising: rendering a user interface for user selection of sound objects for rendering, each sound object being associated with a location in a three-dimensional sound space, wherein the user interface maps sound objects onto at least one shape and identifies sound objects on the shape at a collection of locations on the shape that differs from the associated locations of the identified sound objects; and in response to a user actuation selecting a sound object, rendering at least the selected sound object in the three-dimensional sound space at its associated location.

In some but not necessarily all examples, in response to a first user actuation, rendering an immersive audio preview of a sound scene comprising a set of sound objects by rendering a reduced sound scene comprising rendering each of a sub-set of the set of sound objects in the three-dimensional sound space at its associated location.

In some but not necessarily all examples, in response to a second user actuation, rendering a sound scene comprising the set of sound objects by rendering each of the set of sound objects in the three-dimensional sound space at its associated location.

In some but not necessarily all examples, the user interface identifies sound objects on the shape at different locations using content for each sound object that is indicative of at least one or more of the sound object's characteristics, wherein the sound object characteristics are from the group comprising: relative importance, speech, loudness, duration.

In some but not necessarily all examples, the user interface identifies at least some of the sound objects in the set of sound objects at different locations on one or more shapes, wherein the location of a sound object is dependent upon an importance of that sound object within the set of sound objects.

In some but not necessarily all examples, the method comprises: selecting a part of a shape of the user interface to select the set of sound objects as those sound objects on that part of the shape.

In some but not necessarily all examples, the method comprises before the first user actuation, rendering none or, one or more, but not all, of the sub-set of the set of sound objects in the three-dimensional sound space but without spatial location.

In some but not necessarily all examples, the first actuation selects the sub-set of the set of sound objects.

In some but not necessarily all examples, the first sub-set is dependent upon at least a first location of the first actuation relative to a shape of the user interface and an arrangement of the sound objects in the set of sound objects adjacent the first location.

In some but not necessarily all examples, the method comprises while rendering the immersive audio preview, varying the sub-set to a new sub-set in response to a modifying user interaction, causing rendering a new reduced sound scene comprising rendering each of the sound objects in the new sub-set of the set of sound objects in a three dimensional sound space at its associated location.

In some but not necessarily all examples, the user interface is a condensed visual preview user interface, that maps sound objects onto at least one shape and visually identifies sound objects on the shape at a collection of locations on the shape that differs from the associated locations of the identified sound objects;

In some but not necessarily all examples, the shape is displayed in visible form in the user interface and the user interface visually identifies sound objects on the shape.

In some but not necessarily all examples, the method comprises, after the second user actuation, no longer rendering the user interface.

In some but not necessarily all examples, the method comprises, in response to the second user actuation, rendering a visual scene that corresponds to the rendered sound scene, and varying automatically the rendered visual scene and the corresponding rendered sound scene in dependence upon at least a change in orientation of the user.

An apparatus comprising: user interface rendering means for rendering a user interface for user selection of sound objects for rendering, each sound object being associated with a location in a three-dimensional sound space, wherein the user interface maps sound objects onto at least one shape and identifies sound objects on the shape at a collection of locations on the shape that differs from the associated locations of the identified sound objects; and sound rendering means for rendering, in response to a user actuation selecting a sound object, at least the selected sound object in the three-dimensional sound space at its associated location.

In some but not necessarily all examples, the sound rendering means comprises means for rendering, in response to a first user actuation, an immersive audio preview of a sound scene comprising a set of sound objects by rendering a reduced sound scene comprising rendering each of a sub-set of the set of sound objects in the three-dimensional sound space at its associated location.

In some but not necessarily all examples, the sound rendering means comprises means for rendering, in response to a second user actuation, a sound scene comprising the set of sound objects by rendering each of the set of sound objects in the three-dimensional sound space at its associated location.

In some but not necessarily all examples, the user interface rendering means comprises means for identifying sound objects on the shape at different locations using content for each sound object that is indicative of at least one or more of the sound object's characteristics, wherein the sound object characteristics are from the group comprising: relative importance, speech, loudness, duration.

In some but not necessarily all examples, the user interface rendering means comprises means for identifying at least some of the sound objects in the set of sound objects at different locations on one or more shapes, wherein the location of a sound object is dependent upon an importance of that sound object within the set of sound objects.

In some but not necessarily all examples, the apparatus comprises means for selecting a part of a shape of the user interface to select the set of sound objects as those sound objects on that part of the shape.

In some but not necessarily all examples, the apparatus comprises means for rendering, before the first user actuation, none or, one or more, but not all, of the sub-set of the set of sound objects in the three-dimensional sound space but without spatial location.

In some but not necessarily all examples, wherein the user interface means comprises means for enabling the first actuation to select the sub-set of the set of sound objects.

The first sub-set may be dependent upon at least a first location of the first actuation relative to a shape of the user interface and an arrangement of the sound objects in the set of sound objects adjacent the first location.

In some but not necessarily all examples, the apparatus comprises means that while rendering the immersive audio preview, varies the sub-set to a new sub-set in response to a modifying user interaction, causing rendering a new reduced sound scene comprising rendering each of the sound objects in the new sub-set of the set of sound objects in a three dimensional sound space at its associated location.

In some but not necessarily all examples, the user interface is a condensed visual preview user interface, that is configured to map sound objects onto at least one shape and is configured to visually identify sound objects on the shape at a collection of locations on the shape that differs from the associated locations of the identified sound objects;

In some but not necessarily all examples, the shape is displayed in visible form in the user interface and the user interface is configured to visually identify sound objects on the shape.

In some but not necessarily all examples, the user interface means, after the second user actuation, no longer renders the user interface.

In some but not necessarily all examples, the apparatus comprises means for rendering, in response to the second user actuation, a visual scene that corresponds to the rendered sound scene, and means for varying automatically the rendered visual scene and the corresponding rendered sound scene in dependence upon at least a change in orientation of the user.

The apparatus comprises: at least one processor; and at least one memory including computer program code the at least one memory and the computer program code configured to, with the at least one processor, cause the apparatus 90 at least to perform:

rendering a user interface for user selection of sound objects for rendering, each sound object being associated with a location in a three-dimensional sound space, wherein the user interface maps sound objects onto at least one shape and identifies sound objects on the shape at a collection of locations on the shape that differs from the associated locations of the identified sound objects; and in response to a user actuation selecting a sound object, rendering at least the selected sound object in the three-dimensional sound space at its associated location.

A computer program which when run by a processor enables the processor to cause:

rendering a user interface for user selection of sound objects for rendering, each sound object being associated with a location in a three-dimensional sound space, wherein the user interface maps sound objects onto at least one shape and identifies sound objects on the shape at a collection of locations on the shape that differs from the associated locations of the identified sound objects; and in response to a user actuation selecting a sound object, rendering at least the selected sound object in the three-dimensional sound space at its associated location.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DEFINITIONS

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects.

"mediated reality content" is content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space;

"third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position—location and/or orientation) in virtual space used to generate a perspective-mediated sound scene and/or visual scene.

"notional listener" defines the point of view (virtual position—location and/or orientation) in virtual space used to generate a perspective-mediated sound scene, irrespective of whether or not a user is actually listening "notional viewer" defines the point of view (virtual position—location and/or orientation) in virtual space used to generate a perspective-mediated visual scene, irrespective of whether or not a user is actually viewing.

Three degrees of freedom (3 DoF) describes mediated reality where the virtual position is determined by orientation only (e.g. the three degrees of three-dimensional orientation). In relation to first person perspective-mediated reality, only the user's orientation determines the virtual position.

Six degrees of freedom (6 DoF) describes mediated reality where the virtual position is determined by both orientation (e.g. the three degrees of three-dimensional orientation) and location (e.g. the three degrees of three-dimensional location). In relation to first person perspective-mediated reality, both the user's orientation and the user's location in the real space determine the virtual position.

DETAILED DESCRIPTION

Figure 1:
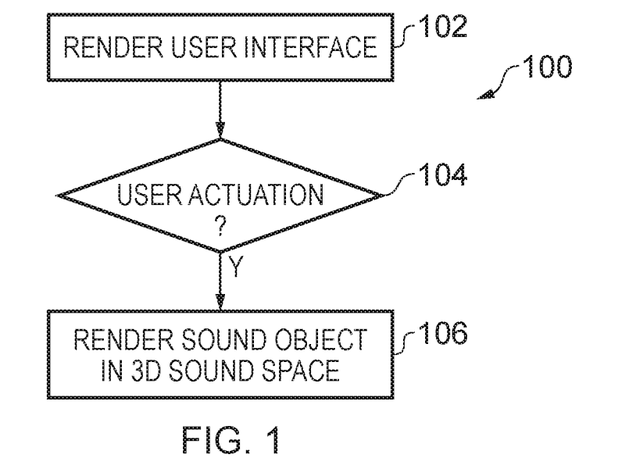
FIG. 1 illustrates an example of a method for rendering a user interface for user selection of sound objects for rendering.

FIG. 1 illustrates an example of a method 100 for rendering a user interface for user selection of sound objects for rendering.

At block 102, the method 100 comprises rendering a user interface for user selection of sound objects for rendering, each sound object being associated with a location in a three-dimensional sound space, wherein the user interface maps sound objects onto at least one shape and identifies sound objects on the shape at a collection of locations on the shape that differs from the associated locations of the identified sound objects.

At block 104, the method 100 determines whether or not a user actuation has occurred that selects a sound object.

At block 106, in response to a user actuation selecting a sound object, the method 100 comprises rendering at least the selected sound object in the three-dimensional sound space at its associated location.

Figure 2A:
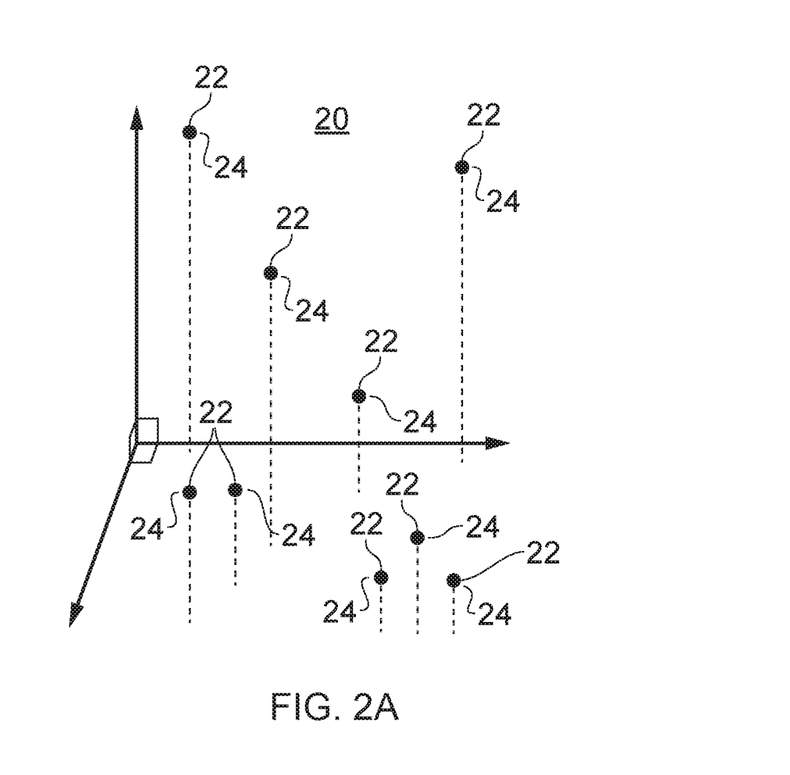
FIG. 2A illustrates an example of a sound space comprising multiple sound objects.

FIG. 2A illustrates an example of a sound space 20 comprising multiple sound objects 22. Each sound object 22 is associated with a location 24 in the three-dimensional sound space 20. If the sound space 20 were to be rendered as illustrated, then each of the sound objects 22 would be rendered at their respective locations 24 creating spatial audio.

Figure 2B:
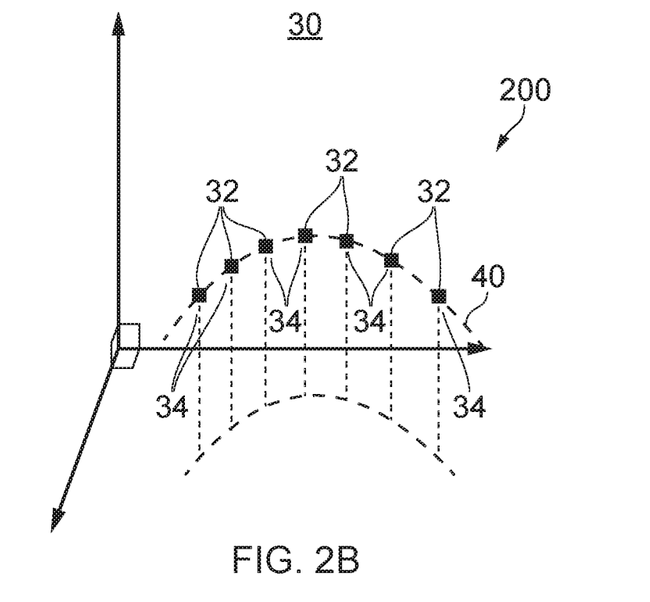
FIG. 2B illustrates an example of a user interface for user selection of sound objects for rendering.

FIG. 2B illustrates the rendering of a user interface 200 for user selection of sound objects 22 for rendering. The user interface 200 may be an audio-only user interface or, in other examples, it may be an audio-visual user interface.

The user interface 200 maps sound objects 22 (in the sound space 20) onto at least one shape 40 (in a mapped space 30) as mapped sound objects 32. The user interface 200 identifies sound objects 22 on the shape 40 at a collection of locations 34 on the shape 40. The locations 34 as a collection differs from the associated locations 24 of the sound objects 22.

Therefore while it is possible for a sound object 22 to have a location 24 that is the same as the location 34 of its mapped sound object 32, it is not possible for this to be true for all sound objects 22. At least some of the sound objects 22 that have a location 24 are mapped to mapped sound objects 32 that have a different location 34 than the location 24.

The mapping has therefore "condensed" the distributed arrangement of the sound objects 22 (FIG. 2A) into an ordered arrangement of the mapped sound objects 32 on the shape 40 (FIG. 2B). The user interface 200 therefore represents a condensation of the sound space 20 and its sound objects onto one or more shapes 40.

The shape 40 may be any suitable shape. The shape may be a one, two or three dimensional shape. It may for example be a straight or curved line or a plane. It may be triangular, circular, elliptical. It may be the surface of a sphere or other three-dimensional shape. In some examples, the optimal shape 40 may be determined based upon the arrangement of the sound objects 22 in the sound space 20 (FIG. 2A). For example, a least squares fit may be determined between the locations 24 of the sound objects 22 in the arrangement of sound objects 22 and the equivalent putative locations 34 of the mapped sound objects 32 on a putative shape 40. The shape with the lowest total cumulative value for the square of the distances between the locations 24 and the equivalent putative locations 34 on the putative shape 40 may be selected as an optimal shape.

The user interface 200 has a plurality of mapped sound objects 32 at locations 34 along a shape 40. These locations 34 do not necessarily correspond to the locations 24 of the sound objects within the sound space 20. The user interface 200 may identify sound objects 22 on the shape 40 at different locations 34 using content for each sound object 22 that is indicative of at least one or more of the sound objects characteristics. The sound object characteristics are, for example, from the group comprising relative importance, speech, loudness, duration. This therefore informs the user when they are making the selection of a sound object 22 in the user interface 200.

The user interface 200 may be a sound-based user interface where the mapped space 30 is a sound space 20 and/or it may be a visually based user interface where the mapped space 30 is a visual space the corresponds to the sound space 20.

In a sound-based user interface 200, each of the mapped sound objects 32 is a sound object rendered at a location 34. Such a sound object may only be selectively rendered that is only rendered when the user selects it, by for example, directing their attention towards it. In this way, it is possible for the user to sample the mapped sound objects 32 in the sound-based user interface 200 and subsequently select one of the mapped sound objects 32.

The user interface 200 maps sound objects 22 (in the sound space 20) onto at least one shape 40 (in a mapped space 30) as mapped sound objects 32. The user may select 104 one of the mapped sound objects 32 by performing an interaction with respect to the sound object 32 and/or shape 40.

Figure 3:
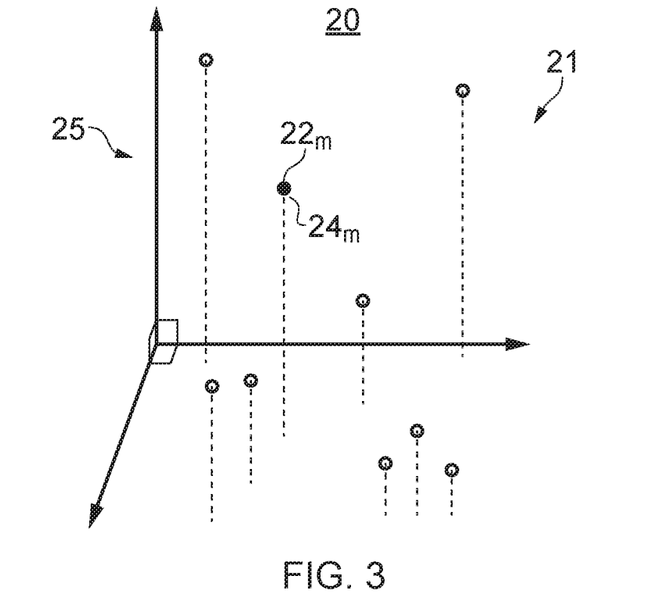
FIG. 3 illustrates an example of rendering a preview reduced sound space comprising a subset of sound objects.

As illustrated in FIG. 3, in response to a user actuation 104 selecting a sound object $22_m$, the method 100 renders at least the selected sound object $22_m$ in the three-dimensional space 20 at its associated location $24_m$. The sound object $22_m$ is therefore rendered as an externalized sound to the user as it would have been rendered if the sound space 20 illustrated in FIG. 2A had been rendered. However, it will of course be appreciated that in this illustrated example only the sound object $22_m$ is rendered. A rendered sound object 22 is illustrated as black icon and a non-rendered sound object 22 is illustrated as white icon.

Figure 4A:
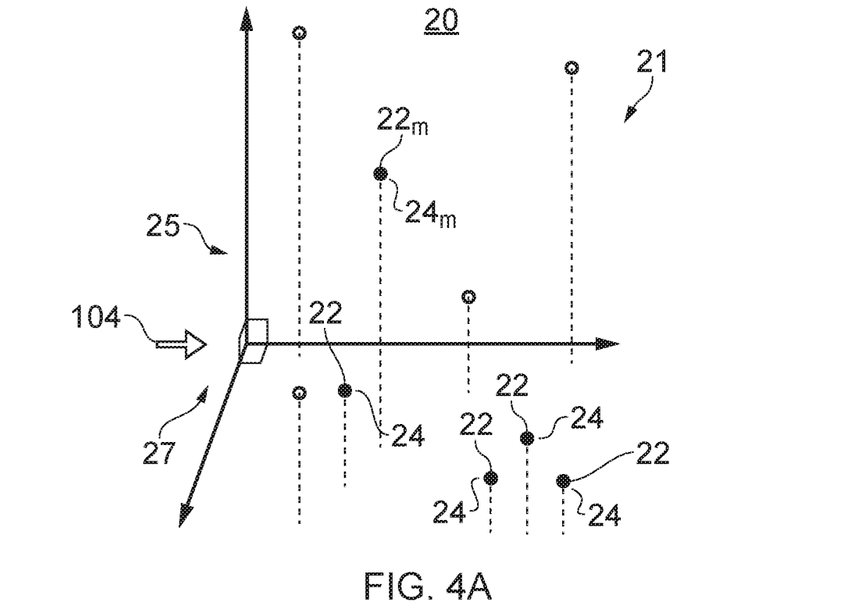
FIG. 4A illustrates an example of rendering a preview reduced sound space comprising a subset of sound objects.

However, in other examples it is possible for more than the single selected sound object $22_m$ to be rendered in response to a user actuation 104 selecting the sound object. As an example, as illustrated in FIG. 4A in response to a first user action 104, the method 100 renders an immersive audio preview 25 of a sound space 20. The sound space 20 comprises a set 23 of sound objects 22 (see FIG. 4B). The preview 25 is a reduced sound space 27 in which each of a subset 21 of the set 23 of sound objects 24 in the three-dimensional sound space 20 is rendered at its associated location 24. A rendered sound object 22 is illustrated as black icon and a non-rendered sound object 22 is illustrated as white icon.

Thus selecting a part of a shape 40 of the user interface, by selecting the selected sound object $22_m$, causes selection of the subset 21 of sound objects. The subset 21 of sound objects may those sound objects on that part of the shape 40.

Figure 4B:
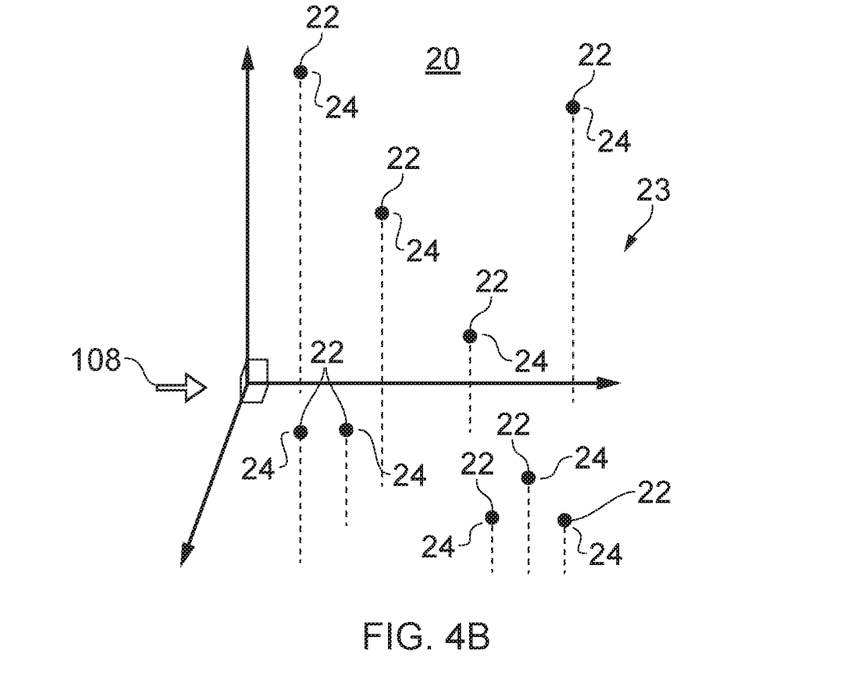
FIG. 4B illustrates an example of rendering a full sound space comprising the full set of sound objects.

FIG. 4B continues on the method 100, for example from FIG. 4A. In response to a second user actuation 108, the method 100 comprises rendering a sound space 20 comprising the set 23 of sound objects 22 by rendering each of the set 23 of sound objects 22 in a three-dimensional sound space 20 at its associated location 24. The rendered sound objects 22 are illustrated as black icons.

It will be appreciated that in this example the set 23 of sound objects 22 rendered at locations 24 provides the same arrangement of sound objects as illustrated in FIG. 2A. In other examples, the set 23 of sound objects 22 may be smaller.

In this example the first user actuation 104 may be a first part of a user actuation and the second user actuation 108 may be a continuation of that user action to its full extent. For example, the first user action 104 may involve a modest or small head movement of the user in a first direction whereas the second user actuation 108 may involve a larger head movement of the user in the same first direction. It may therefore be possible for the user to obtain a preview 25 by leaning towards the user interface 200 and then, having observed the preview 25 of FIG. 3 or 4A for example, enter the full rendering illustrated in FIG. 4B by leaning further towards the user interface 200.

It is of course possible in other examples for the user to perform different user actuations 104, 108 and achieve the same effects.

It will be appreciated that the example illustrated in FIG. 3 is a preview 25 that corresponds to the example of the preview 25 in FIG. 4A, when the sub-set 21 has a single member.

In the examples of FIGS. 3, 4A, 4B, 5A and 5B, the virtual position of a virtual user remains constant. The perspective from which the sound space 20 is rendered remains constant. In other examples, the virtual position of a virtual user may be changed by a user during preview 25 and/or may be changed by a user when performing the actuation 108 to transition from preview to full rendering (FIG. 4B). For example, the direction of the user actuation 104, 108 may control at least a virtual orientation of the virtual user. The user is thus able to obtain and control a concise summary of a large volumetric (spatial) sound scene, for example by simply performing the user actuation 104, 108 in a defined way.

In the examples of FIGS. 4A and 4B, there have been two discrete transitions. The first transition is from the user interface 200 (FIG. 2B) to the preview 25 of FIG. 4A. The second transition is from the preview 25 of FIG. 4A to the rendering of the full sound space 20 with all of the sound objects 22 rendered. In other examples (FIGS. 5A, 5B) there may be a continuum of transitions through more detailed previews 25 between the rendering of the initial preview 25 (FIG. 4A) and the rendering of the full sound space 20 (FIG. 4B).

For example, the immersive audio preview 25 may start by rendering a reduced sound space comprising only one or a few sound objects 24. That is, where the sub-set 21 is small. The method 100 may be then continue by gradually increasing the size of the sub-set 21 so that more sound objects 22 are rendered. The addition of sound objects to the sub-set 21 that is rendered may occur gradually over time after the first user actuation 104, in which case a second user actuation 108 is not required to arrive at rendering the full sound space 20 as this will be achieved after a pre-determined time period. In other examples, it may be necessary for the user to maintain a first user actuation 104 to enable the variation of the sub-set 21. In other examples, it may be necessary for the user to perform additional user actuations. For example repeating the first user actuation 104 or extending the first user actuation 104, repeatedly with each repetition increasing the sub-set 21.

Figure 5A:
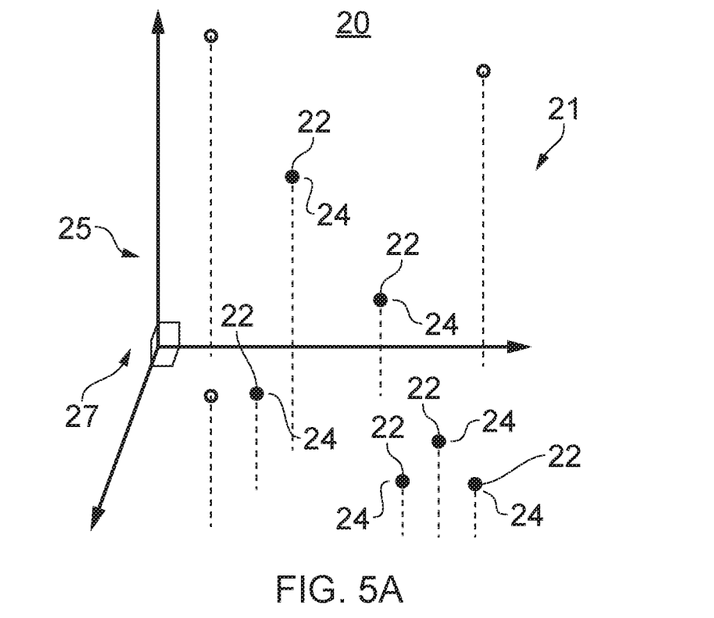
FIG. 5A illustrates an example of rendering a new preview reduced sound space comprising a new subset of sound objects.
Figure 5B:
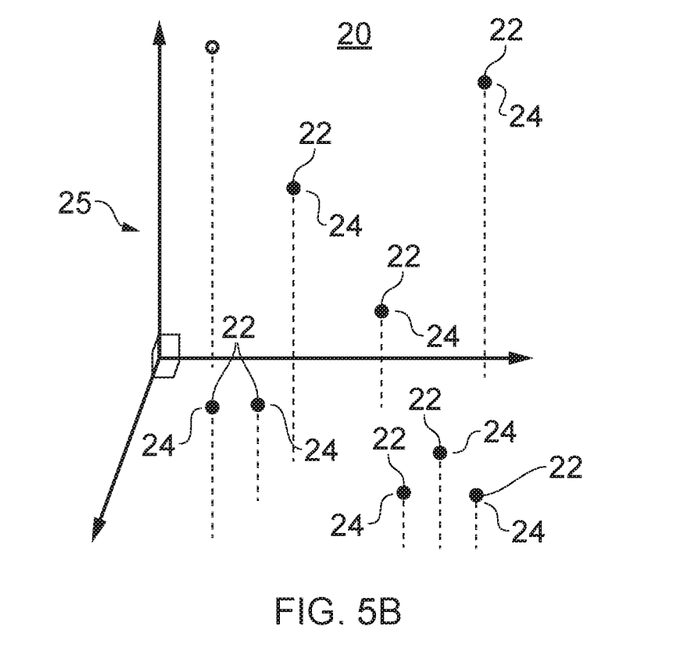
FIG. 5B illustrates an example of rendering a new preview reduced sound space comprising a new subset of sound objects.

It is therefore possible, while rendering the immersive audio preview 25, to vary the sub-set 21 to a new sub-set 21' in response to a modifying user interaction. This causes rendering of a new reduced sound space 27' comprising rendering each of the sound objects 22 in the new sub-set 21' of the set of sound objects 22 in a three-dimensional sound space 20 at its associated location 24. FIGS. 5A and 5B illustrates an example of such new reduced sound spaces 27' comprising rendering each of the sound objects 22 of the new sub-set 21'. It will be appreciated that varying the sub-set 21, in the example of FIG. 5A, comprises adding a sound object 22 compared to FIG. 4A. In the example of FIG. 5B, which may occur subsequently to FIG. 5A, varying the sub-set 21 in this example comprises adding two sound objects 22 compared to FIG. 5A.

It will therefore be appreciated that at one point in time, the method comprises rendering the reduced sound scene 27 comprising rendering each of the sound objects 22 in the sub-set 21 of the set of sound objects 22 in a three-dimensional sound space 30 at its associated location 24 (FIG. 4A) and at a later time the method 100 comprises rendering the new reduced sound scene 27' comprising rendering each of the sound objects 22 in the new sub-set 21' of the set of sound objects 22 in a three dimensional sound space 20 at its associated location 24.

The order in which sound objects are added to the new sub-set 21' may be based upon any suitable criteria.

For example, the rendering of the new reduced sound scene 27' as a preview 25 may be based upon a new nominal user location and/or increased hearing acuity of the user (increased hearing range). A nominal volume (space) associated with the user increases in size and/or changes location to encompass new sound objects 22 and as the new sound objects 22 are encompassed by this nominal volume (space) they are included into the new sub-set 21'. In one example, but not necessarily all examples, the rendering of the reduced sound space 27 as a preview 25 in FIG. 4A is based upon a new sub-set 21' determined by a distance to a user and/or a location of the user. The distance may be fixed or be varied. The location may be fixed or varied. The order in which sound objects are added to the new sub-set 21' may be based on a simulation of user movement (a change in nominal user location).

Alternatively, or additionally sound objects 22 may be included into the new sub-set 21' based upon some other criteria for example level of importance rather than distance to user.

In FIG. 4A, the sound objects 22 in the sub-set 21 are not necessarily the sound objects 22 that have a location 24 closest to a location $24_m$ of the selected sound object $22_m$. In FIGS. 5A & 5B, the newly added sound objects 22 in the new sub-set 21' are not necessarily the sound objects 22 that are not in the sub-set 21 that have a location 24 closest to a location $24_m$ of the selected sound object $22_m$.

Figure 6:
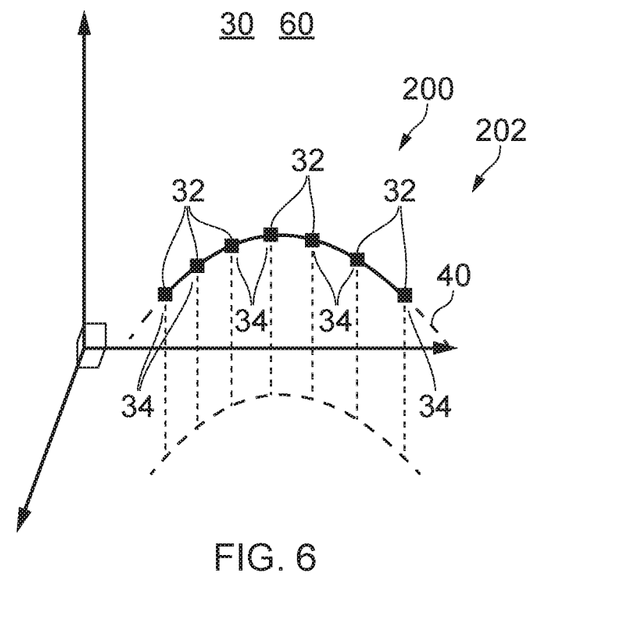
FIG. 6 illustrates an example of a visual user interface.

FIG. 6 illustrates an example of a visual user interface 202 which provides a visual part of the user interface 200. Visual means that the interface or object or space is displayed so that it can be seen by the user. In this example the mapped space 30 is a virtual visual space 60. Each of the mapped sound objects 32 is rendered as a virtual visual object within the visual user interface 202. In addition, in this example, but not necessarily all examples, the shape 40 is also represented visually as a virtual visual object within the virtual visual space 60.

The user may select 104 one of the mapped sound objects 32 by performing an interaction with respect to the virtual visual object representing that mapped sound object 32. Such interactions are well known and may, for example, include touching or selecting the virtual visual object.

The user interface 200 may be a condensed visual preview interface 202 that maps sound objects 22 onto at least one shape 40 and visually identifies sound objects 22 on the shape as mapped sound objects 32 at a collection of locations 34 on the shape 40 that differs from the associated locations 24 of the identified sound objects 22. The shape 40 may be displayed in visible form in the user interface 202 and the user interface 202 may visually identify the mapped sound objects 32 on the shape 40. The user interface 202 may visually identify 32 at least some of the sound objects 22 in the set of sound objects at different locations 34 on one or more shapes of 40.

The location of a sound object 22 may be dependent upon an importance of that sound object within the set of sound objects. For example, the most important sound object 22 may be placed in the middle of the shape 40 and the sound objects 22 that surround the most important sound object(s) are placed across the shape 40, for example from left to right. In some examples, the least relevant sound objects 22 are excluded from the user interface 40. The location of entry into the volumetric content (the virtual orientation) may be determined by a midpoint of the sound objects 22 at the location surrounding the place to which the user actuation 104 is directed.

Irrespective of the type of user interface 200, the user may perform a number of different types of actuations 104, 108. As previously described, a suitable interaction is the user leaning towards the user interface 200. Another suitable interaction is the user performing a grab action and pulling the shape 40 towards the user. Where a grab action is used it may be possible for the user to perform a two-handed grab and thereby select which sound objects 22 are to be rendered in the reduced sound scene 27. For example, those mapped sound objects 32 that lie between the user's outstretched hands may be used as the basis for identifying the equivalent sound objects 22 of the subset 21 that are rendered as the reduced sound scene 27.

Thus, the first user actuation 104 can select the sub-set 21 of sound objects 22. The first sub-set 21 is, for example, dependent upon at least a first location of the first actuation of 104 relative to the shape 40 of the user interface 200 and an arrangement of the mapped sound objects 32 adjacent to that first location.

In some examples, it may be possible for the user to reposition or scale the shape 40 by interacting with the shape 40.

Figure 7:
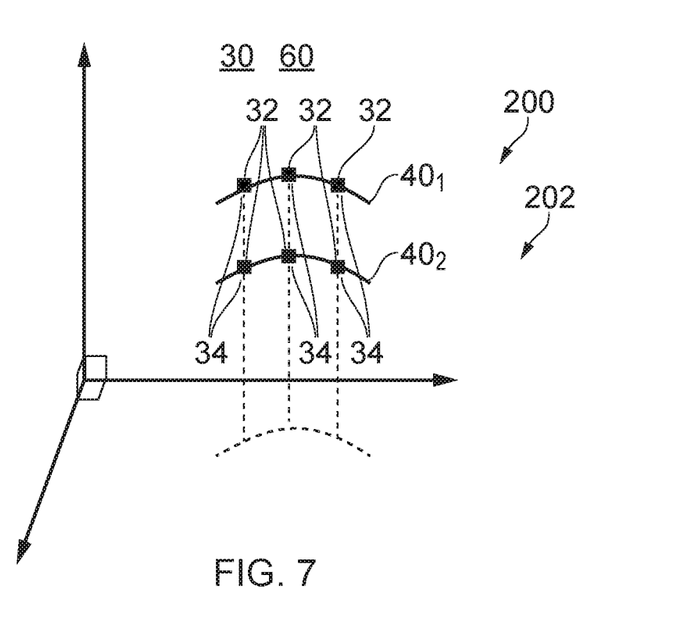
FIG. 7 illustrates an example of a user interface comprising more than one shape of mapped sound objects.

FIG. 7 illustrates an example in which the user interface 200 comprises more than one shape 40. Mapped sound objects 32 are located on a first shape $40_1$ and also on a second shape $40_2$. The user interface 200 identifies some of the sound objects in the set 23 of sound objects 22 at different locations on one of the shapes 40 and identifies some of the other sound objects 22 in the set at different locations on another of the shapes 40. However, as described previously the locations 34 of the mapped sound objects 32 in the mapped space 30 are different to the locations of the equivalent sound objects 22 in the sound space 20.

The location of a mapped sound object 32 may be based upon its importance. For example, in the example of FIG. 6, the location 34 of a mapped sound object 32 on the single shape 40 may be based upon an importance of the sound object 22 that has been mapped to create the mapped sound object 32. For example, the most important sound objects may have equivalent mapped sound objects 32 at a central location 34.

In the example of FIG. 7, one of the shapes $40_2$ may be associated with more important sound objects 22 whereas the other of the shapes $40_1$ may be associated with less important or background sound objects 22.

In one embodiment, the sound objects for either shape 40 are previewed by a user in the same way. The distance between the shapes $40_1$, $40_2$ in the user interface 200 may be used to define a mix ratio between the sound objects associated with the shape $40_1$ and the sound object 22 associated with the shape $40_2$.

When the user interface 200 is being rendered, before the first user actuation 104, the method may comprise rendering none, or one or more, but not all of the sub-set 21 of the set of sound objects 22 in the three-dimensional sound space 20 but without spatial location. That is when the user interface 200 is provided, it may be possible to hear some but not all of the sound objects but not as spatial audio. The user may therefore be able to sample the audio content but without the spatial aspect. The preview 25 illustrated in FIGS. 3 and 4A (and FIGS. 5A and 5B) therefore provides spatial dimension to the rendering of an audio object 22 that was absent during the rendering of the user interface 200.

In relation to FIG. 4B, it is noted that after the second user actuation 108, the user interface 200 is no longer rendered. In fact, in the examples illustrated in FIGS. 3, 4A, 5A, 5B, after the first user actuation 104, the user interface 200 is no longer rendered.

The actions caused by the first user actuation 104 may be reversed. This may occur automatically if the first user actuation 104 is stopped (the reversal may start immediately or after a timeout period) and/or this may occur automatically if the first user actuation 104 is reversed.

The actions caused by the second user actuation 108 may be reversed. This may occur automatically if the first user actuation 104 is stopped (the reversal may start immediately or after a timeout period) and/or this may occur automatically if the first user actuation 104 is reversed.

FIGS. 8A, 8B, 9A, 9B, 10A and 10B illustrate the application of the method 100 to a situation where there is rendering of mediated reality. In this context, mediated reality means the rendering of mediated reality for the purposes of achieving mediated reality for example augmented reality or virtual reality. In these examples, the mediated reality is first person perspective-mediated reality. It may or may not be user interactive. It may be 3 DoF or 6 DoF.

Figure 8A:
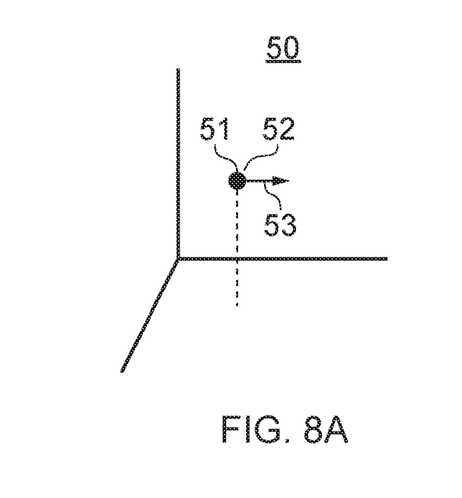
FIGS. 8A, 8B, 9A, 9B, 10A and 10B illustrate an example of the application of the method to a situation where there is rendering of first person perspective-mediated reality.
Figure 9A:
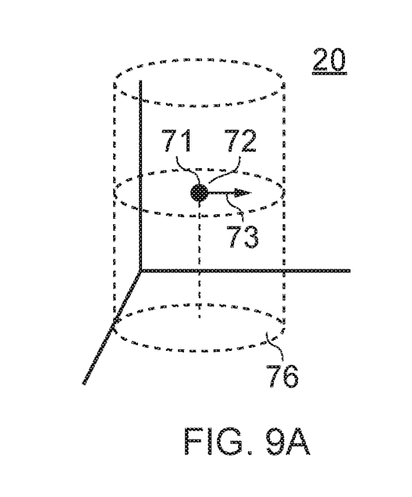
Figure 10A:
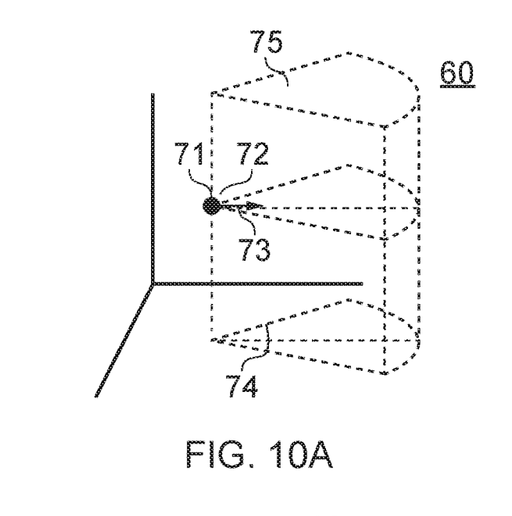

FIGS. 8A, 9A, 10A illustrate at a first time a real space 50, a sound space 20 and a visual space 60. A user 51 in the real space 50 has a location 52 and an orientation 53. The location is a three-dimensional location and the orientation is a three-dimensional orientation.

In 3 DoF mediated reality, an orientation 53 of the user 50 controls a virtual orientation 73 of a virtual user 71. There is a correspondence between the orientation 52 and the virtual orientation 73 such that a change in the orientation 52 produces the same change in the virtual orientation 73. The virtual orientation 73 of the virtual user 71 in combination with a virtual field of view 74 defines a virtual visual scene 75 within the virtual visual space 60. In some examples, it may also define a virtual sound scene 76. A virtual visual scene 75 is that part of the virtual visual space 60 that is displayed to a user. A virtual sound scene 76 is that part of the virtual sound space 20 that is rendered to a user. The virtual sound space 20 and the virtual visual space 60 correspond in that a position within the virtual sound space 20 has an equivalent position within the virtual visual space 60.

In the example of 6 DoF mediated reality, the situation is as described for 3 DoF and in addition it is possible to change the rendered virtual sound scene 76 and the displayed virtual visual scene 75 by movement of a location 52 of the user 51. For example, there may be a mapping between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered sound scene 76 and also changes the rendered visual scene 75.

Figure 8B:
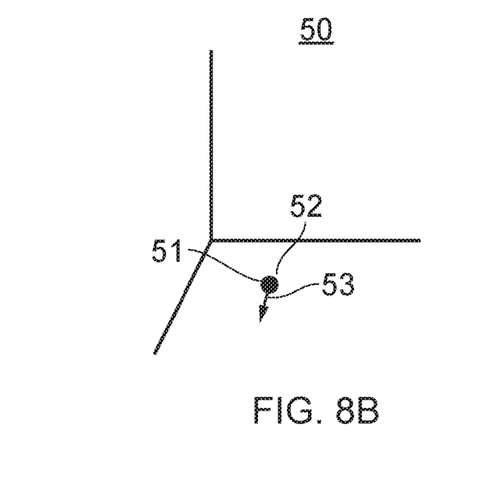
Figure 9B:
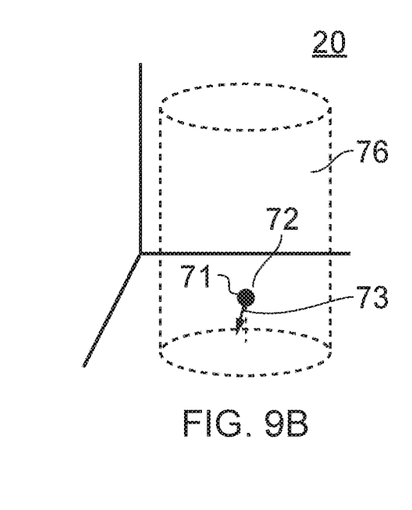
Figure 10B:
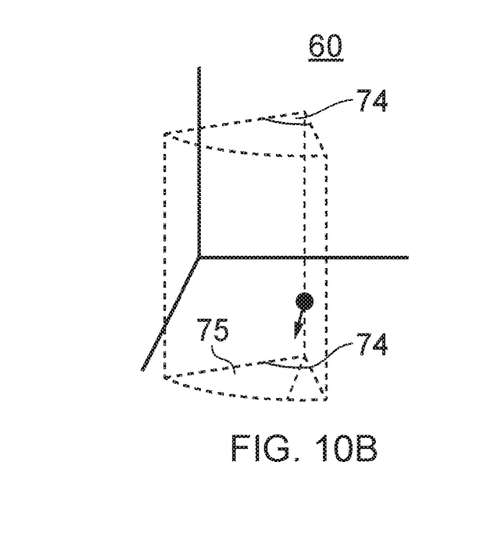

This may be appreciated from FIGS. 8B, 9B and 10B which illustrate the consequences of a change in location 52 and orientation 53 of the user 51 on respectively the rendered sound scene 76 (FIG. 9B) and the rendered visual scene 75 (FIG. 10B).

Embodiments of the method 100 may find application in different scenarios. For example it may be useful for selective rendering of audio, for example, in the selective industrial communication scenario. The user by performing different actuations, for example looking in different directions, may be able to control what they hear and what they do not hear.

Figure 11A:
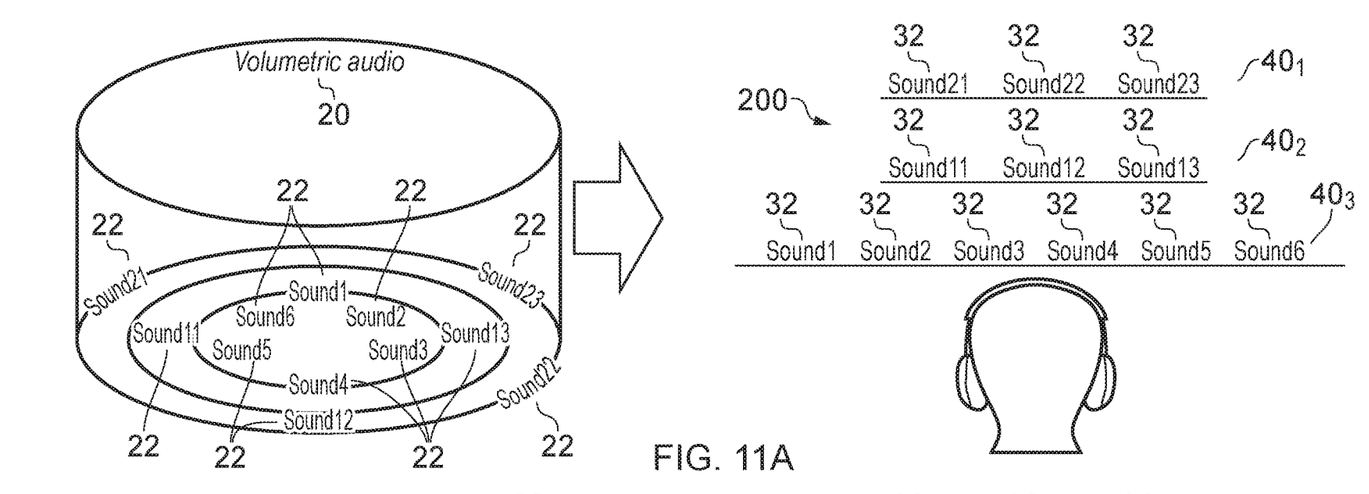
FIGS. 11A, 11B and 11C illustrate examples of the grouping of sound objects into different groups where each group is mapped onto a different shape of the user interface.
Figure 11B:
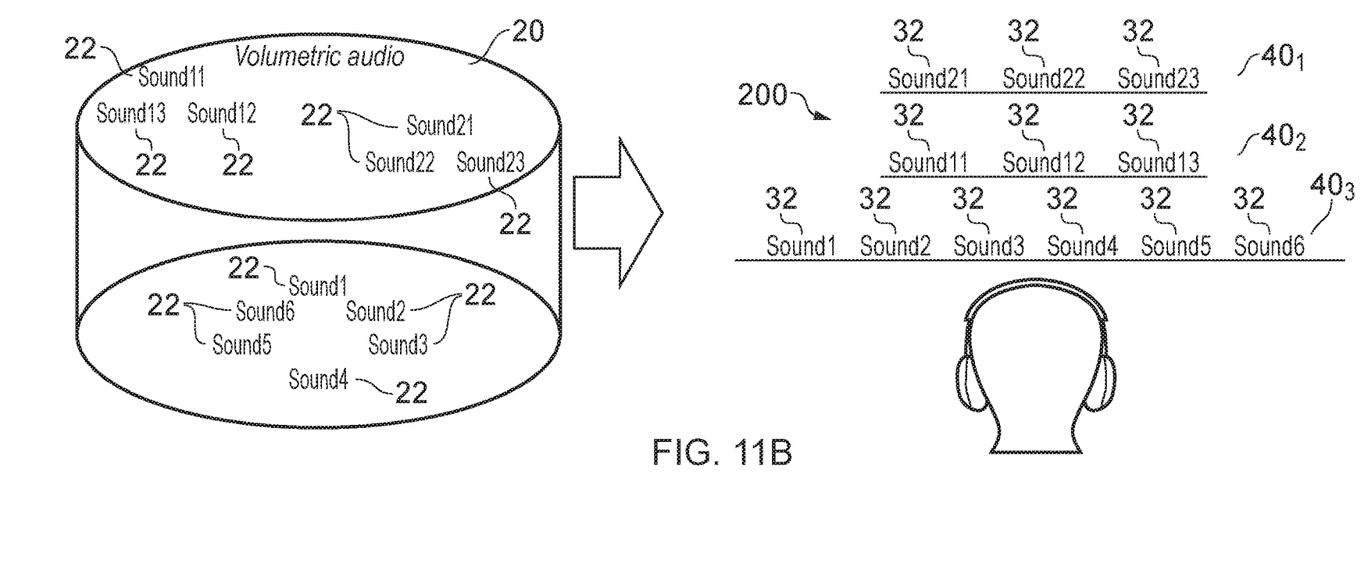
Figure 11C:
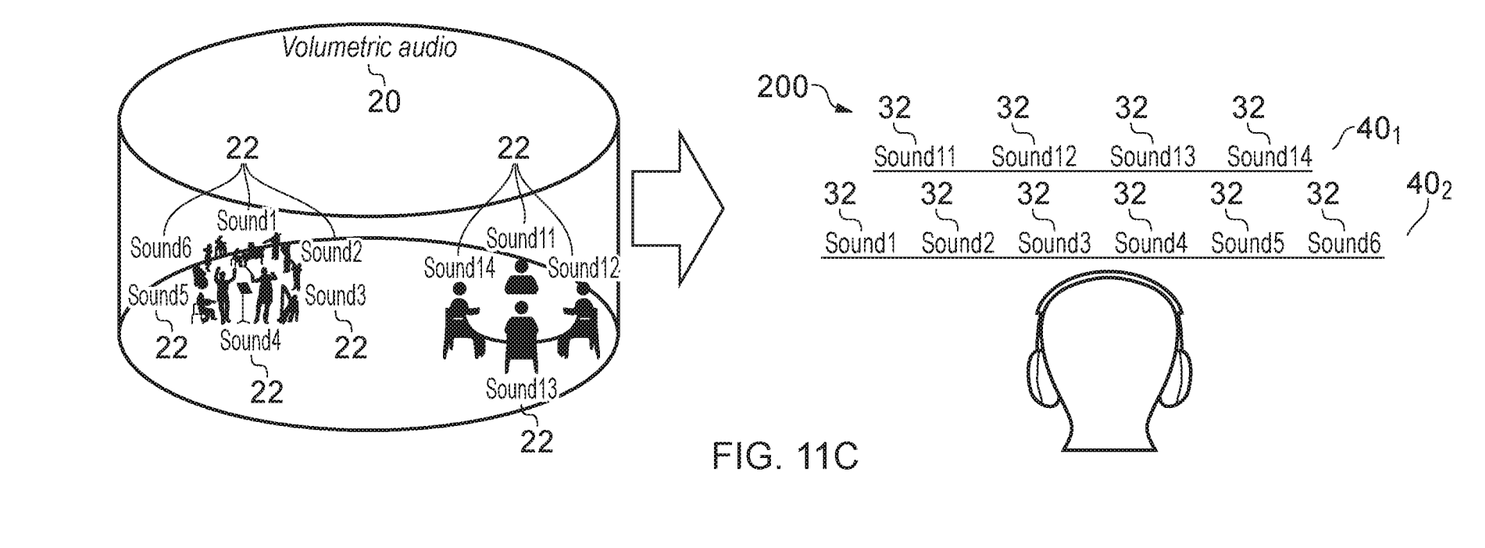

FIGS. 11A, 11B and 11C illustrate examples of the grouping of sound objects 22 into different groups where each group is mapped onto a different shape 40 of the user interface 200.

In FIG. 11A, the groups of sound objects 22 are based on their relative distance from an arbitrary point in the sound space 20. The sound objects 22 in a first group, are furthest away (background) and are mapped to the mapped sound objects 32 on the first shape $40_1$. The sound objects 22 in a second group, are neither furthest away nor closest (midground) and are mapped to the mapped sound objects 32 on the second shape $40_2$. The sound objects 22 in a third group, are closest (foreground) and are mapped to the mapped sound objects 32 on the third shape $40_3$.

In the example of FIG. 11B, the sound objects 22 are grouped based upon a relative distance measurement, in this case their height within the sound space 20. The sound objects 22 in a first group, are highest and are mapped to the mapped sound objects 32 on the first shape $40_1$. The sound objects 22 in a second group next highest and are mapped to the mapped sound objects 32 on the second shape $40_2$.

The sound objects 22 in a third group, are lowest and are mapped to the mapped sound objects 32 on the third shape $40_3$.

In the example of FIG. 11C, the sound objects 22 are grouped based upon the audio content. In this example a first set of sound objects are detected to relate to music and are grouped as an orchestra and are mapped to the mapped sound objects 32 on the shape $40_2$. The other sound objects are grouped as persons talking together and are mapped to the mapped sound objects 32 on the shape $40_1$.

The above described examples have a number of different advantages. For example, a new user is provided with a simplified user interface 200 that simplifies a volumetric (spatial) sound space 20 allowing them to more easily navigate the sound space 20. The method 100 enables a content creator to quickly listen to different parts of the spatial audio content. The method 100 may be incorporated into other third party applications for browsing or rendering mediated reality content.

The user interface 200 reduces the complexity and provides a summary. This allows the user to simply decide from a preview (FIG. 4A, FIG. 3) if he wants to explore a particular part of the sound space 20 in full detail with the original spatial distribution of the sound objects (FIG. 4B).

In one example, the user is previewing the sound space 20 (FIG. 4A, FIG. 3) in response to a user interaction 104. The user in this preview hears the sound objects 22 of the first subset 21 in their proper location 24 (different to the location 34 in the mapped space 30 on the user interface 200). Thus by making the interaction 104, the sound objects 22 of the first subset 21 start to surround the user's head (FIG. 4A, FIG. 3). The user can hear a detailed preview (FIG. 4A) of what the actual volumetric (spatial) sound scene would sound like at that location. If the user continues with the user actuation 108 he enters the full volumetric (spatial) audio experience at that virtual location (FIG. 4B).

Implementation of a controller 92 may be as controller circuitry. The controller 92 may be implemented in hardware alone, have certain aspects in software including firmware alone or can be a combination of hardware and software (including firmware).

Figure 12A:
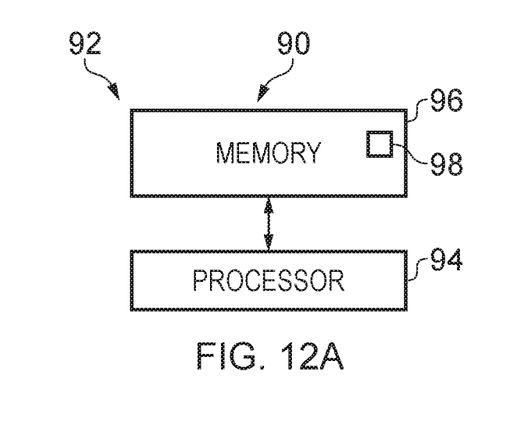
FIG. 12A illustrates an example of a controller and FIG. 12B illustrates an example of a computer program.

As illustrated in FIG. 12A the controller 92 may be implemented using instructions that enable hardware functionality, for example, by using executable instructions of a computer program 98 in a general-purpose or special-purpose processor 94 that may be stored on a computer readable storage medium (disk, memory etc.) to be executed by such a processor 94.

The processor 94 is configured to read from and write to the memory 96. The processor 94 may also comprise an output interface via which data and/or commands are output by the processor 94 and an input interface via which data and/or commands are input to the processor 94.

The memory 96 stores a computer program 98 comprising computer program instructions (computer program code) that controls the operation of the apparatus 90 when loaded into the processor 94. The computer program instructions, of the computer program 98, provide the logic and routines that enables the apparatus to perform the methods illustrated in FIGS. 1 to 11. The processor 94 by reading the memory 96 is able to load and execute the computer program 98.

The apparatus 90 therefore comprises:

at least one processor 94; and at least one memory 96 including computer program code the at least one memory 96 and the computer program code configured to, with the at least one processor 94, cause the apparatus 90 at least to perform:

rendering a user interface 200 for user selection of sound objects 22 for rendering, each sound object 22 being associated with a location 24 in a three-dimensional sound space 20, wherein the user interface 200 maps sound objects 22 onto at least one shape 40 as mapped sound object 32 identifying sound objects 22 at a collection of locations 34 on the shape 40 that differs from the associated locations 24 of the identified sound objects 22; and in response to a user actuation 104 selecting a sound object 22, rendering at least the selected sound object 22 in the three-dimensional sound space 20 at its associated location 24.

Figure 12B:
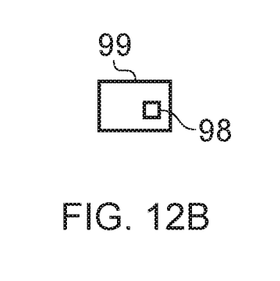

As illustrated in FIG. 12B, the computer program 98 may arrive at the apparatus 90 via any suitable delivery mechanism 99. The delivery mechanism 99 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 98. The delivery mechanism may be a signal configured to reliably transfer the computer program 98. The apparatus 90 may propagate or transmit the computer program 98 as a computer data signal.

Although the memory 96 is illustrated as a single component/circuitry it may be implemented as one or more separate components/circuitry some or all of which may be integrated/removable and/or may provide permanent/semi-permanent/dynamic/cached storage.

Although the processor 94 is illustrated as a single component/circuitry it may be implemented as one or more separate components/circuitry some or all of which may be integrated/removable. The processor 94 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1 to 11 may represent steps in a method and/or sections of code in the computer program 98. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user, the apparatus 92, controller 92 or computer program 98 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one non-transitory memory including computer program code, the at least one memory and the computer program code configured to, with the at least one processor, cause the apparatus to perform at least the following:
render a user interface for user selection of sound objects for rendering, each sound object being associated with a location in a three-dimensional sound space, wherein the user interface maps the sound objects onto at least one shape and identifies the sound objects on the at least one shape at a collection of locations on the at least one shape that differs from a set comprising the associated locations of the identified sound objects, wherein identifying the sound objects on the at least one shape comprises identifying the sound objects using content for each sound object that is indicative of one or more sound object characteristics, wherein the one or more sound object characteristics are from the group comprising: relative importance, speech, loudness, duration; and
in response to a user actuation associated with a location on the at least one shape, select at least one sound object associated with the location and render at least the at least one selected sound object in the three-dimensional sound space at its associated location.

2. An apparatus as claimed in claim 1, wherein in response to a first user actuation, rendering an immersive audio preview of a sound scene comprising a set of the sound objects, wherein the rendering of the immersive audio preview comprises rendering a reduced sound scene comprising rendering each of the sound objects of a sub-set of the set of sound objects in the three-dimensional sound space at its associated location.

3. An apparatus as claimed in claim 2, wherein in response to a second user actuation, rendering a sound scene comprising the set of sound objects, wherein the rendering of the sound scene comprises rendering each of the sound objects of the set of sound objects in the three-dimensional sound space at its associated location.

4. An apparatus as claimed in claim 1, wherein the at least one memory and the computer program code are configured to, with the at least one processor, further cause the apparatus to perform the following:
in response to the user actuation associated with the location on the at least one shape, select a part of the at least one shape, select a set of sound objects on that part of the shape, and render the set of sound objects in the three-dimensional sound space at their associated locations.

5. An apparatus as claimed in claim 2, wherein the at least one memory and the computer program code are configured to, with the at least one processor, further cause the apparatus to perform the following:
before the first user actuation, render none or, one or more, but not all, of the sound objects of the sub-set of the set of sound objects in the three-dimensional sound space but not at its respective associated location.

6. An apparatus as claimed in claim 2, wherein the first user actuation selects the sub-set of the set of sound objects.

7. An apparatus as claimed in claim 2, wherein the sub-set is dependent upon at least a first location of the first user actuation relative to at least one of the at least one shape of the user interface and an arrangement of the sound objects in the set of sound objects adjacent the first location.

8. An apparatus as claimed in claim 2, wherein the at least one memory and the computer program code are configured to, with the at least one processor, further cause the apparatus to perform the following:
while rendering the immersive audio preview, vary the sub-set to a new sub-set in response to a modifying user interaction, and cause rendering of a new reduced sound scene comprising rendering each of the sound objects in the new sub-set of the set of sound objects in the three-dimensional sound space at its associated location.

9. An apparatus as claimed in claim 1, wherein the user interface is a condensed visual preview user interface that maps the sound objects onto the at least one shape and visually identifies the sound objects on the at least one shape.

10. An apparatus as claimed in claim 1, wherein the at least one shape is displayed in visible form in the user interface and the user interface visually identifies the sound objects on the at least one shape.

11. An apparatus as claimed in claim 3, wherein the at least one memory and the computer program code are configured to, with the at least one processor, further cause the apparatus to perform the following:
after the second user actuation, stop rendering the user interface for user selection of the sound objects for rendering.

12. An apparatus as claimed in claim 3, wherein the at least one memory and the computer program code are configured to, with the at least one processor, further cause the apparatus to perform the following:
in response to the second user actuation, render a visual scene that corresponds to the rendered sound scene, and vary automatically the rendered visual scene and the corresponding rendered sound scene in dependence upon at least a change in orientation of the user.

13. A method comprising:
rendering a user interface for user selection of sound objects for rendering, each sound object being associated with a location in a three-dimensional sound space, wherein the user interface maps the sound objects onto at least one shape and identifies the sound objects on the at least one shape at a collection of locations on the at least one shape that differs from a set comprising the associated locations of the identified sound objects, wherein identifying the sound objects on the at least one shape comprises identifying the sound objects using content for each sound object that is indicative of one or more sound object characteristics, wherein the one or more sound object characteristics are from the group comprising: relative importance, speech, loudness, duration; and
in response to a user actuation associated with a location on the at least one shape, selecting at least one sound object associated with the location and rendering at least the at least one selected sound object in the three-dimensional sound space at its associated location.

14. A method as claimed in claim 13, wherein in response to a first user actuation, rendering an immersive audio preview of a sound scene comprising a set of the sound objects, wherein the rendering of the immersive audio preview comprises rendering a reduced sound scene comprising rendering each of the sound objects of a sub-set of the set of sound objects in the three-dimensional sound space at its associated location.

15. A method as claimed in claim 14, wherein in response to a second user actuation, rendering a sound scene comprising the set of sound objects, wherein the rendering of the sound scene comprises rendering each of the sound objects of the set of sound objects in the three-dimensional sound space at its associated location.

16. A non-transitory computer readable medium comprising program instructions stored thereon for performing at least the following:

render a user interface for user selection of sound objects for rendering, each sound object being associated with a location in a three-dimensional sound space, wherein the user interface maps the sound objects onto at least one shape and identifies the sound objects on the at least one shape at a collection of locations on the at least one shape that differs from a set comprising the associated locations of the identified sound objects, wherein identifying the sound objects on the at least one shape comprises identifying the sound objects using content for each sound object that is indicative of one or more sound object characteristics, wherein the one or more sound object characteristics are from the group comprising: relative importance, speech, loudness, duration; and in response to a user actuation associated with a location on the at least one shape, select at least one sound object associated with the location and render at least the at least one selected sound object in the three-dimensional sound space at its associated location.

17. A non-transitory computer readable medium as claimed in claim 16, further comprising program instructions stored thereon for performing:

in response to the user actuation associated with the location on the at least one shape, select a part of the at least one shape, select a set of sound objects on that part of the shape, and render the set of sound objects in the three-dimensional sound space at their associated locations.

18. A non-transitory computer readable medium as claimed in claim 16, wherein the user interface identifies at least some of the sound objects at different locations on a first shape and identifies at least some of the sound objects at different locations on a second shape, wherein the location of a sound object on one of the first or second shape is dependent upon a distance of the sound object from a point in the three-dimensional sound space.

19. An apparatus as claimed in claim 1, wherein the user interface identifies at least some of the sound objects at different locations on a first shape and identifies at least some of the sound objects at different locations on a second shape, wherein the location of a sound object on one of the first or second shape is dependent upon a distance of the sound object from a point in the three-dimensional sound space.

20. A method as claimed in claim 13, wherein the user interface identifies at least some of the sound objects at different locations on a first shape and identifies at least some of the sound objects at different locations on a second shape, wherein the location of a sound object on one of the first or second shape is dependent upon a distance of the sound object from a point in the three-dimensional sound space.

* * * * *